US012811202B2

(12) United States Patent
Sasaki

(10) Patent No.: US 12,811,202 B2
(45) Date of Patent: Nov. 24, 2026

(54) LIQUID LEAKAGE DETECTION SYSTEM AND STACKED CELL MODULE

(71) Applicant: TOYOTA JIDOSHA KABUSHIKI KAISHA, Toyota (JP)

(72) Inventor: Manabu Sasaki, Hashima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 558 days.

(21) Appl. No.: 18/479,506

(22) Filed: Oct. 2, 2023

(65) Prior Publication Data

US 2024/0194954 A1 Jun. 13, 2024

(30) Foreign Application Priority Data

Dec. 7, 2022 (JP) ................................ 2022-195952

(51) Int. Cl.
*H01M 10/42* (2006.01)
*H01M 10/48* (2006.01)
*H01M 50/103* (2021.01)
*H01M 50/569* (2021.01)

(52) U.S. Cl.
CPC ..... *H01M 10/4228* (2013.01); *H01M 10/482* (2013.01); *H01M 50/103* (2021.01); *H01M 50/569* (2021.01)

(58) Field of Classification Search
CPC ........... H01M 10/4228; H01M 10/482; H01M 50/569; H01M 50/103
See application file for complete search history.

(56) References Cited

U.S. PATENT DOCUMENTS

2020/0067145 A1 2/2020 Yamashima et al.
2021/0265711 A1* 8/2021 Utsumi ............... H01M 50/562
2022/0102820 A1* 3/2022 Yamamoto ........... H01M 50/54

FOREIGN PATENT DOCUMENTS

JP 2014-063663 A 4/2014
JP 2020061221 A * 4/2020
WO 2019/102986 A1 5/2019

OTHER PUBLICATIONS

EPO machine generated English translation of JP-2020061221-A (Year: 2020).*

* cited by examiner

*Primary Examiner* — Kimberly Wyluda
(74) *Attorney, Agent, or Firm* — SoraIP, Inc.

(57) ABSTRACT

The liquid leakage detection system includes a stacked cell module including a plurality of cells stacked along a gravity direction, a connector electrically connected to the cell, and a processor configured to determine whether or not the stacked cell module is leaking based on an electrical signal input from the connector, wherein the cell includes a plate-shaped secondary battery, a sealing portion that stores the cell and seals an outer periphery of the cell, a voltage detection terminal having one end electrically connected to a cathode or an anode of the secondary battery and the other end exposed to the outside of the sealing portion, and a liquid leakage detection terminal that is electrically insulated from the secondary battery and the voltage detection terminal, is located directly below the voltage detection terminal, and is fixed to the sealing portion.

4 Claims, 6 Drawing Sheets

LIQUID LEAKAGE DETECTION SYSTEM AND STACKED CELL MODULE

CROSS-REFERENCE TO RELATED APPLICATION

This application claims priority to Japanese Patent Application No. 2022-195952 filed on Dec. 7, 2022, incorporated herein by reference in its entirety.

BACKGROUND

1. Technical Field

The present disclosure relates to a liquid leakage detection system and a stacked cell module.

2. Description of Related Art

WO2019/102986 discloses a technology in which a liquid leakage sensor is disposed in a leaked liquid retention region (portion where an electrolytic solution is likely to stay when the electrolytic solution leaks from a battery cell).

SUMMARY

In a case where each cell includes a voltage detection terminal for detecting a voltage in each cell, liquid junction may occur between the voltage detection terminals of the cells before liquid leakage is detected by the liquid leakage sensor in the configuration of WO2019/102986.

The present disclosure has been made in view of the above, and an object thereof is to provide a liquid leakage detection system and a stacked cell module in which the occurrence of liquid junction can be reduced between voltage detection terminals of cells.

A liquid leakage detection system according to the present disclosure includes: a stacked cell module including a plurality of cells stacked along a gravitational direction; a connector electrically connected to the cells; and a processor configured to determine whether liquid leakage occurs in the stacked cell module based on an electrical signal input from the connector. Each of the cells includes: a plate-shaped secondary battery; a sealing portion that contains the cell and seals an outer periphery of the cell; a voltage detection terminal including one end electrically connected to a cathode or an anode of the secondary battery and the other end exposed to an outside of the sealing portion; and a liquid leakage detection terminal electrically insulated from the secondary battery and the voltage detection terminal, positioned immediately below the voltage detection terminal, and fixed to the sealing portion. The connector includes liquid leakage detection terminal connection portions to which the liquid leakage detection terminals are electrically connected. The processor is configured to determine whether liquid junction occurs between the voltage detection terminal and the liquid leakage detection terminal based on an electrical signal input from the liquid leakage detection terminal connection portion.

A stacked cell module according to the present disclosure includes a plurality of cells stacked along a gravitational direction. Each of the cells includes: a plate-shaped secondary battery; a sealing portion that contains the cell and seals an outer periphery of the cell; a voltage detection terminal including one end electrically connected to a cathode or an anode of the secondary battery and the other end exposed to an outside of the sealing portion; and a liquid leakage detection terminal electrically insulated from the secondary battery and the voltage detection terminal, positioned immediately below the voltage detection terminal, and fixed to the sealing portion.

According to the present disclosure, it is possible to realize the liquid leakage detection system and the stacked cell module in which the occurrence of liquid junction can be reduced between the voltage detection terminals of the cells.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A liquid leakage detection system and a stacked cell module according to an embodiment of the present disclosure will be described with reference to the drawings. Incidentally, the constituent elements in the following embodiments include those that can be easily replaced by a person skilled in the art or those that are substantially the same.

Embodiment 1

Configuration of Liquid Leakage Detection System

Figure 1:
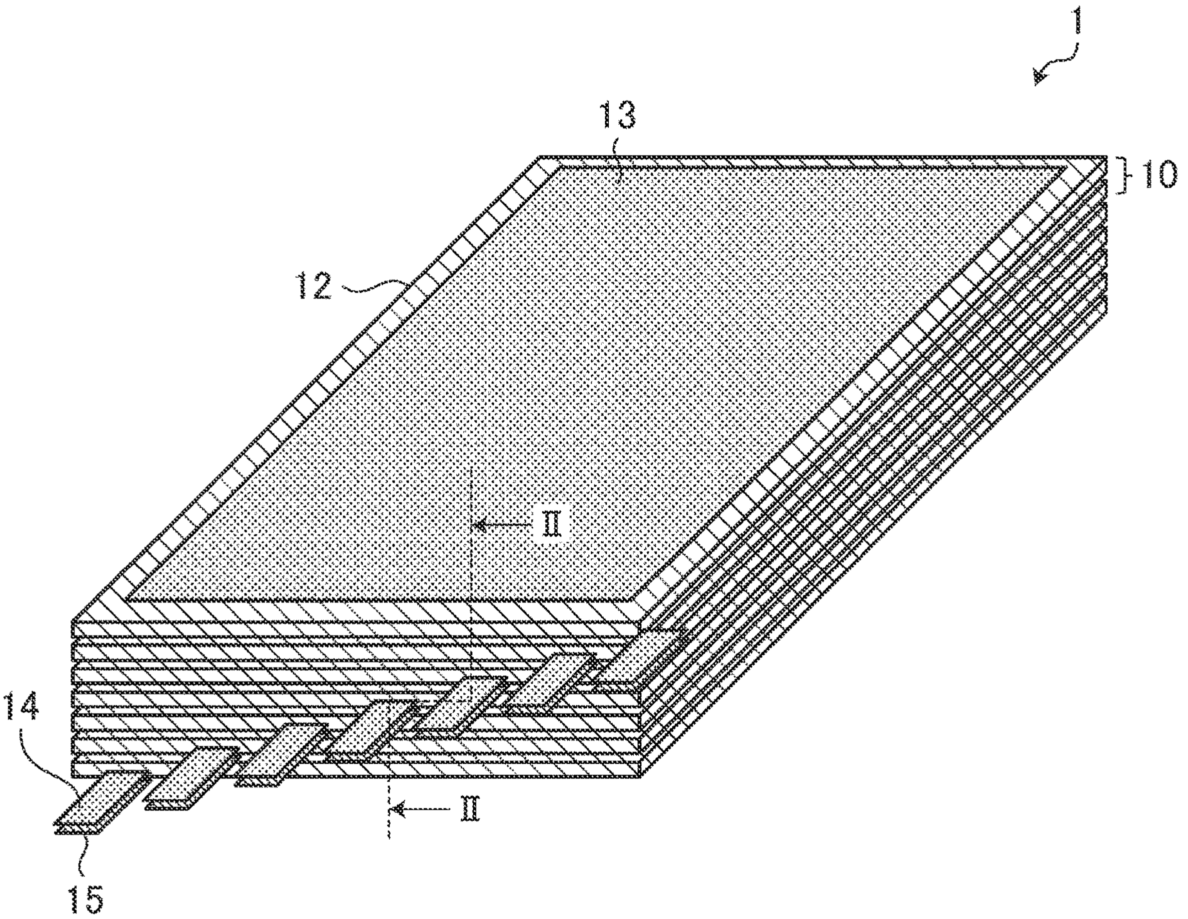
FIG. 1 is a configuration diagram of a stacked cell module according to Embodiment 1.
Figure 2:
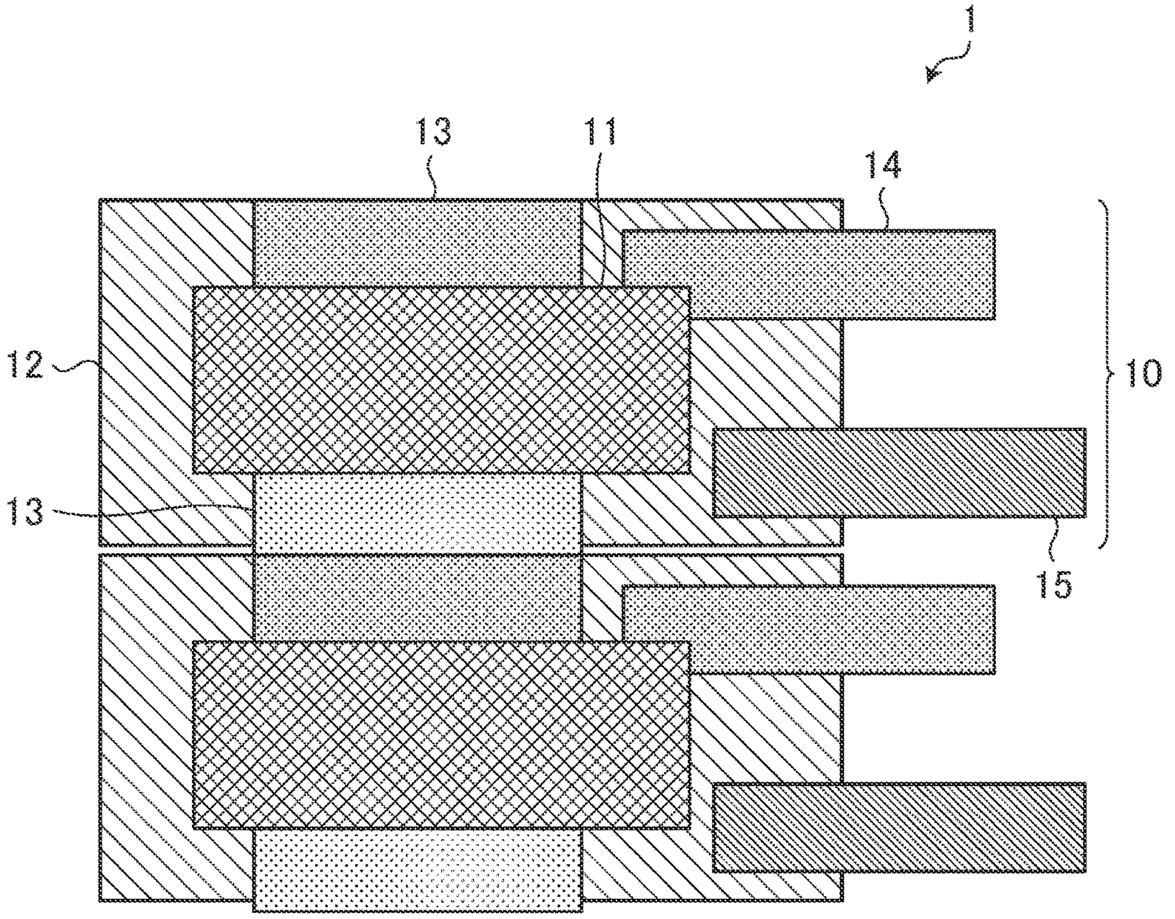
FIG. 2 is a cross-sectional view corresponding to II-II of FIG. 1.
Figure 3:
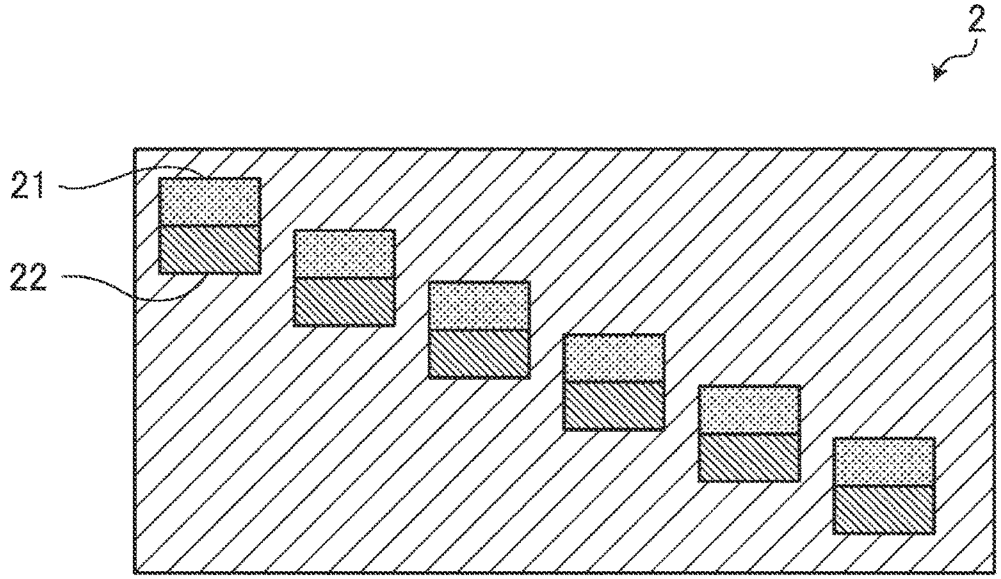
FIG. 3 is a configuration diagram of a connector.
Figure 4:
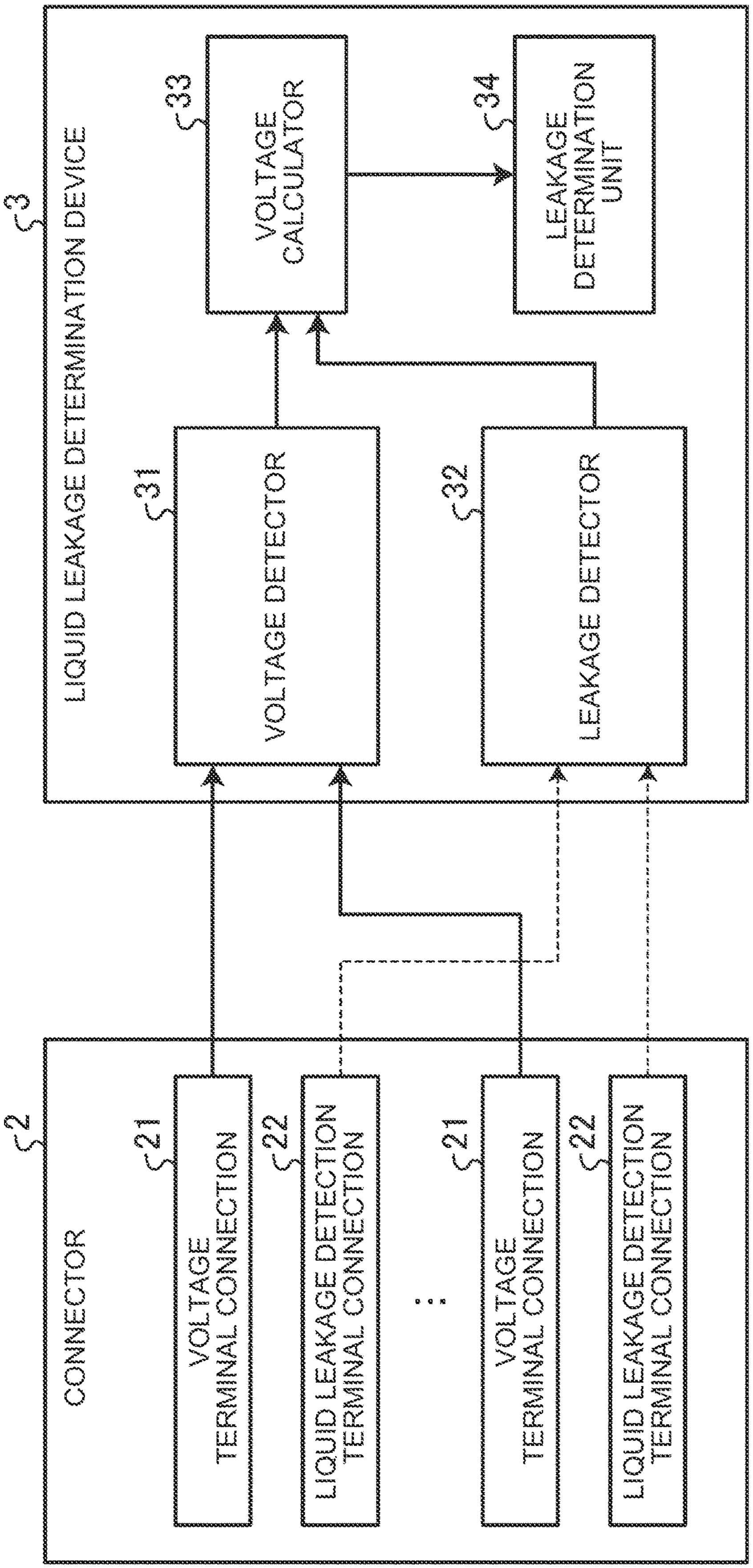
FIG. 4 is a block diagram of a connector and a liquid leakage determination unit.

The liquid leakage detection system includes the stacked cell module 1 illustrated in FIGS. 1 and 2, the connector 2 illustrated in FIGS. 3 and 4, and the liquid leakage determination unit 3 illustrated in FIG. 4. The stacked cell module 1 includes a plurality of cells stacked along the gravity direction. The connector 2 is electrically connected to the cells of the stacked cell module 1. The liquid leakage determination unit 3 determines whether or not the stacked cell module 1 is leaking based on an electrical signal input from the connector 2.

Configuration of Stacked Cell Module

FIG. 1 is a configuration diagram of a stacked cell module according to Embodiment 1. As shown in FIG. 1, the stacked cell module 1 includes a plurality of cells 10 stacked along the gravitational direction.

FIG. 2 is a cross-sectional view corresponding to II-II of FIG. 1. As illustrated in FIG. 2, each cell 10 includes a secondary battery 11, a sealing portion 12, an output surface 13, a voltage detection terminal 14, and a liquid leakage detection terminal 15.

The secondary battery 11 has, for example, a plate shape and is stacked in a bipolar structure along the gravitational direction. The secondary battery 11 includes a cathode and an anode, a resin frame, an electrolyte, and a separator. The cathode and the anode are coated on a copper foil or an aluminum foil forming the output surface 13 and are arranged so as to face each other. The resin frame forms the sealing portion 12. The electrolyte is filled inside the resin frame. The separator is disposed inside the resin frame and electrically insulates the cathode and the anode from each other.

The sealing portion 12 stores the cells and seals the outer periphery of the cells. The sealing portion 12 has an insulating property and is made of, for example, resin.

The output surface 13 outputs electric power of the secondary battery 11.

The plurality of cells 10 is stacked so that the output surface 13 of each cell 10 is in contact with each other. With this configuration, a plurality of cells 10 is connected in series. As described above, the stacked cell module 1 having a bipolar structure is formed. Since the stacked cell module 1 has a bipolar structure, a high-voltage battery cell can be formed.

One end of the voltage detection terminal 14 is electrically connected to a cathode or an anode of the secondary battery 11. The other end of the voltage detection terminal 14 is exposed to the outside of the sealing portion 12. The voltage detection terminals 14 of the cells 10 are arranged at different positions in the horizontal direction. FIG. 2 shows an example in which the voltage detection terminals 14 of the cells 10 are arranged in a stepped manner. However, it is sufficient that the voltage detection terminals 14 of the cells 10 are arranged at different positions in the horizontal direction.

The liquid leakage detection terminal 15 is electrically insulated from the secondary battery 11 and the voltage detection terminal 14. The liquid leakage detection terminal 15 is located directly below the voltage detection terminal 14 and is fixed to the sealing portion 12. The liquid leakage detection terminal 15 may be embedded in the sealing portion 12. However, the liquid leakage detection terminal 15 may be adhered to the surface of the sealing portion 12.

Connector Configuration

FIG. 3 is a configuration diagram of a connector. As illustrated in FIG. 3, the connector 2 includes a voltage detection terminal connection portion 21 and a liquid leakage detection terminal connection portion 22.

The voltage detection terminal 14 is electrically connected to the voltage detection terminal connection portion 21.

A liquid leakage detection terminal 15 is electrically connected to the liquid leakage detection terminal connection portion 22.

Configuration of the Liquid Leakage Determination Unit

The liquid leakage determination unit 3 is, for example, a personal computer. The liquid leakage determination unit 3 includes a processor including, for example, Central Processing Unit (CPU), Digital Signal Processor (DSP), Field-Programmable Gate Array (FPGA), and the like, and a memory (main storage unit) including, Random Access Memory (RAM), Read Only Memory (ROM), and the like.

The liquid leakage determination unit 3 determines whether or not the voltage detection terminal 14 and the liquid leakage detection terminal 15 are in liquid junction based on the electrical signals input from the voltage detection terminal connection portion 21 and the liquid leakage detection terminal connection portion 22.

FIG. 4 is a block diagram of the connector and the liquid leakage determination unit. As illustrated in FIG. 4, the liquid leakage determination unit 3 includes a voltage detection unit 31, a liquid leakage detection unit 32, a voltage calculation unit 33, and a liquid leakage determination unit 34.

An electrical signal from the voltage detection terminal connection portion 21 is input to the voltage detection unit 31.

An electrical signal from the liquid leakage detection terminal connection portion 22 is input to the liquid leakage detection unit 32.

The voltage calculation unit 33 calculates the voltage at the voltage detection terminal 14 based on the electrical signal from the voltage detection terminal connection portion 21 input via the voltage detection unit 31. Further, the voltage calculation unit 33 calculates the voltage at the liquid leakage detection terminal 15 based on the electrical signal from the liquid leakage detection terminal connection portion 22 input via the liquid leakage detection unit 32.

The liquid leakage determination unit 34 determines whether or not each cell 10 is leaking by using the voltage of the liquid leakage detection terminal 15. When the liquid does not leak from the interface between the sealing portion 12 and the voltage detection terminal 14, no voltage is applied to the liquid leakage detection terminal 15 from the outside. Therefore, the liquid leakage determination unit 34 determines that the liquid is not leaking if the voltage of the liquid leakage detection terminal 15 calculated by the voltage calculation unit 33 is the discharge pressure. On the other hand, when the electrolyte of the secondary battery 11 leaks from the interface between the sealing portion 12 and the voltage detection terminal 14, the leaked electrolyte drips downward due to gravity and may reach the liquid leakage detection terminal 15 located immediately below. When the leaked electrolyte reaches the liquid leakage detection terminal 15, a voltage from the secondary battery 11 is applied to the liquid leakage detection terminal 15. Therefore, the liquid leakage determination unit 34 determines that the liquid leakage has occurred if the voltage of the liquid leakage detection terminal 15 calculated by the voltage calculation unit 33 is not the solution discharge pressure but the actual voltage.

According to the first embodiment described above, each cell 10 of the stacked cell module 1 includes the liquid leakage detection terminal 15 located directly below the voltage detection terminal 14. Therefore, when the liquid leaks from the interface between the sealing portion 12 and the voltage detection terminal 14, the leaked electrolyte immediately reaches the liquid leakage detection terminal 15 located immediately below. As a result, the liquid leakage of each cell 10 can be detected before the liquid junction occurs between the voltage detection terminals 14 of each cell 10. In addition, it is possible to reduce a liquid junction from occurring between the voltage detection terminals 14 of the cells 10.

In each cell 10 of the stacked cell module 1, the voltage detection terminals 14 are arranged at different positions in the horizontal direction. Therefore, in the stacked cell module 1, it is difficult for a liquid junction to occur between the voltage detection terminals 14 of the cells 10.

In the case where the liquid leakage determination unit 3 does not use the high voltage of the stacked cell module 1 as a driving power source and an external low voltage source is used as a power source, the liquid leakage determination unit 3 may determine the liquid leakage by detecting that the high voltage and the low voltage are short-circuited or resistance-short-circuited.

Modification 1

Figure 5:
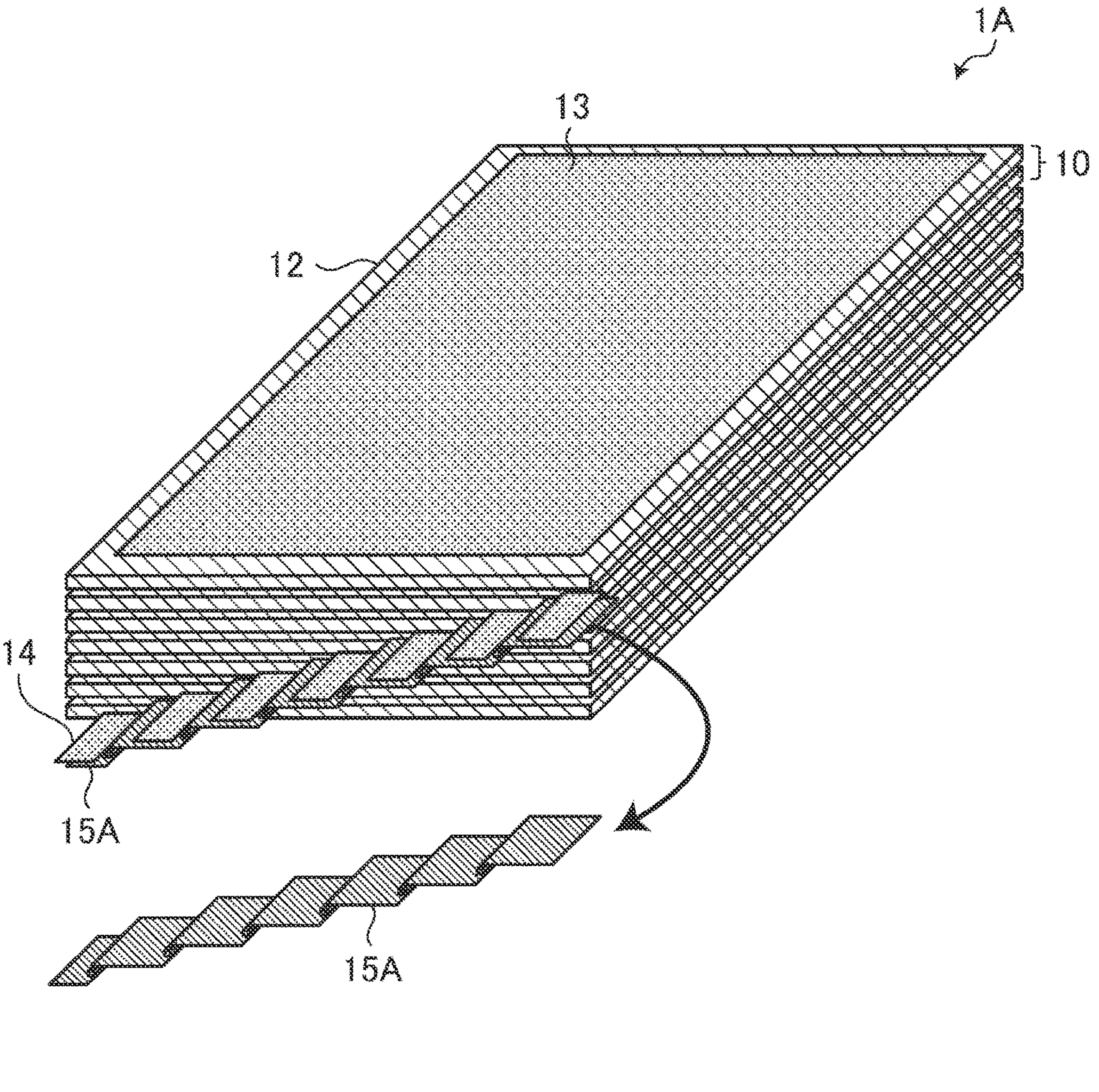
FIG. 5 is a configuration diagram of a stacked cell module according to Modification 1.

FIG. 5 is a configuration diagram of a stacked cell module according to Modification 1. As shown in FIG. 5, in the stacked cell module 1A, the liquid leakage detection terminals 15A of the cells 10 are integrally formed and electrically connected to each other. In this case, the shape of the liquid leakage detection terminal connecting portion of the connector also needs to be a shape corresponding to the liquid leakage detection terminal 15A. As described above, by integrally configuring the liquid leakage detection terminal 15A, the wires connecting the liquid leakage detection terminal connection portion 22 and the liquid leakage detection unit 32 can be combined into a single wire. Therefore, the configuration of the stacked cell module can be simplified.

Modification 2

Figure 6:
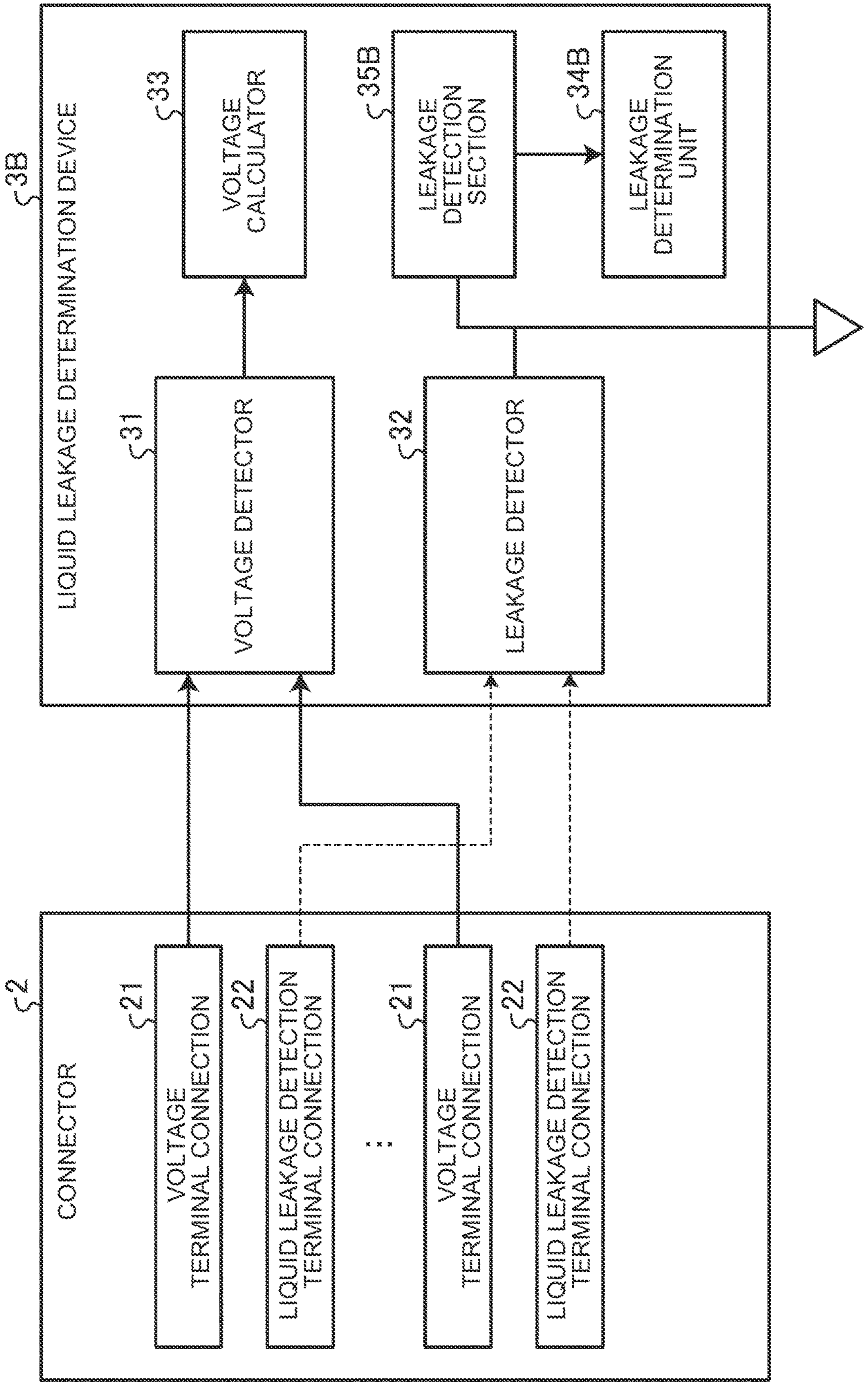
FIG. 6 is a block-diagram of a connector and a liquid leakage determination unit according to a second modification.

FIG. 6 is a block diagram of a connector and a liquid leakage determination unit according to Modification 2. As illustrated in FIG. 6, the liquid leakage determination unit 3B includes a liquid leakage determination unit 34B and a liquid leakage detection unit 35B.

The liquid leakage detection unit 35B detects whether or not an electric leakage has occurred in the stacked cell module 1 based on an electrical signal from the liquid leakage detection terminal connection portion 22 inputted via the liquid leakage detection unit 32.

When the liquid leakage detection unit 35B detects that an electric leakage has occurred in the stacked cell module 1, the liquid leakage determination unit 34B determines that a liquid leakage has occurred in the stacked cell module 1.

According to the liquid leakage determination unit 3B, the voltage calculation unit 33 may not calculate the voltage at the liquid leakage detection terminal 15. Therefore, it is possible to easily determine whether or not the stacked cell module 1 is leaking, while reducing the workload of the liquid leakage determination unit 3B.

Modification 3

Figure 7:
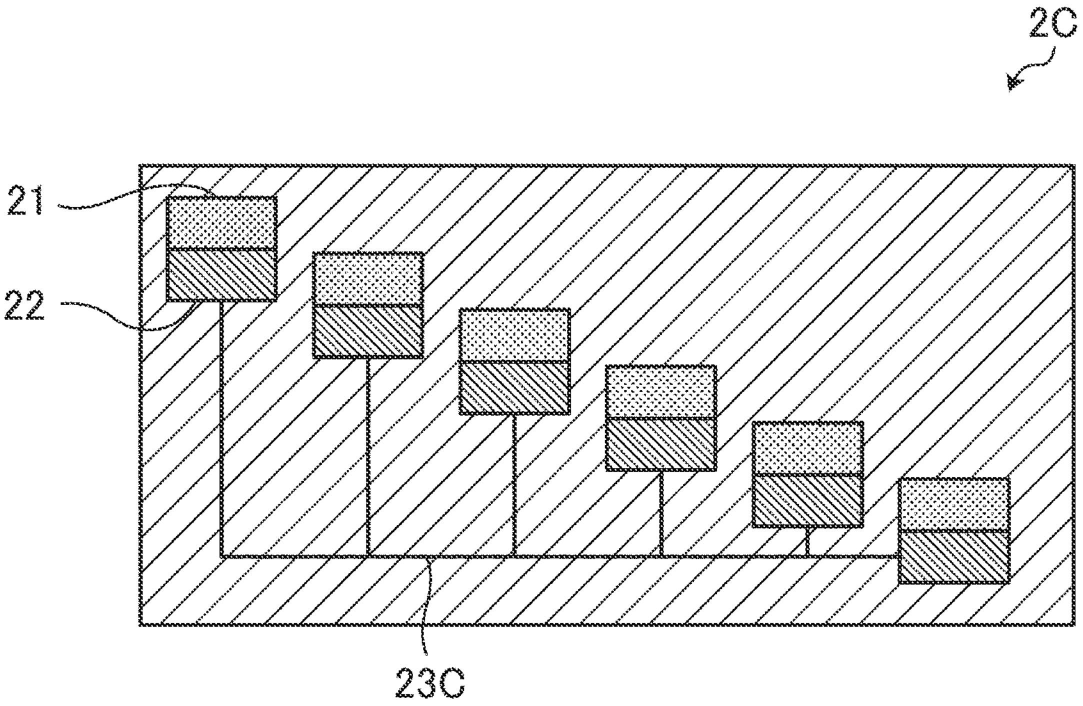
FIG. 7 is a configuration diagram of a connector according to Modification 3.

FIG. 7 is a configuration diagram of a connector according to Modification 3. As shown in FIG. 7, the connector 2C includes connection circuitry 23C for electrically connecting the respective liquid leakage detection terminal connection portions 22. As described above, by electrically connecting the liquid leakage detection terminal connection portions 22, it is possible to collect a single wiring connecting the liquid leakage detection terminal connection portion 22 and the liquid leakage detection unit 32. Therefore, the configuration of the connector can be simplified.

Additional benefits and variations can be readily derived by one of ordinary skill in the art. Thus, the broader aspects of the disclosure are not limited to the specific details and representative embodiments presented and described above. Accordingly, various modifications may be made without departing from the spirit or scope of the general inventive concept as defined by the appended claims and their equivalents.

What is claimed is:

1. A liquid leakage detection system comprising:

a stacked cell module including a plurality of cells stacked along a gravitational direction;

a connector electrically connected to the cells; and a processor configured to determine whether liquid leakage has occurred in the stacked cell module based on an electrical signal input from the connector, wherein:

each of the cells includes:

a plate-shaped secondary battery;

a sealing portion that surrounds the secondary battery and seals an outer periphery of the secondary battery;

a voltage detection terminal including one end electrically connected to a cathode or an anode of the secondary battery and another end exposed to an outside of the sealing portion; and a liquid leakage detection terminal electrically insulated from the secondary battery and the voltage detection terminal, positioned directly below the voltage detection terminal, and fixed to the sealing portion, the connector includes liquid leakage detection terminal connection portions to which the liquid leakage detection terminals are electrically connected, and the processor is configured to determine whether liquid junction has occurred between the voltage detection terminal and the liquid leakage detection terminal of a cell of the plurality of cells based on an electrical signal input from the liquid leakage detection terminal connection portion electrically connected to the liquid leakage detection terminal of the cell.

2. The liquid leakage detection system according to claim 1, wherein the liquid leakage detection terminals are electrically connected to each other.

3. The liquid leakage detection system according to claim 1, wherein the voltage detection terminals are disposed at different positions in a horizontal direction.

4. The liquid leakage detection system according to claim 1, wherein the secondary batteries are stacked in a bipolar structure.

* * * * *